Carl L. Lichte
INVENTOR.

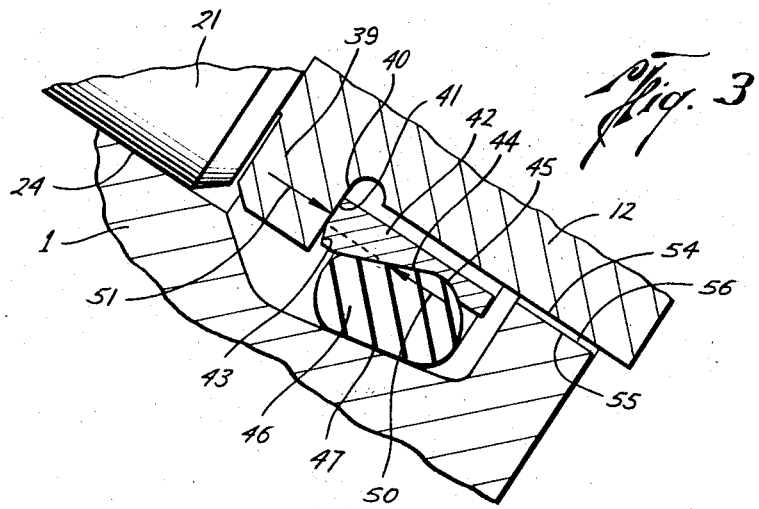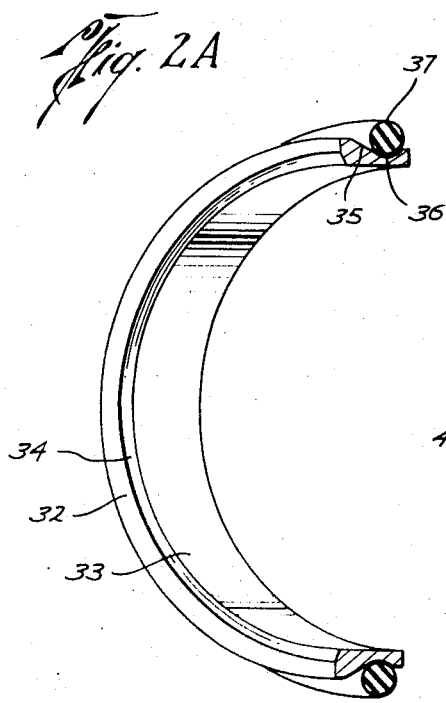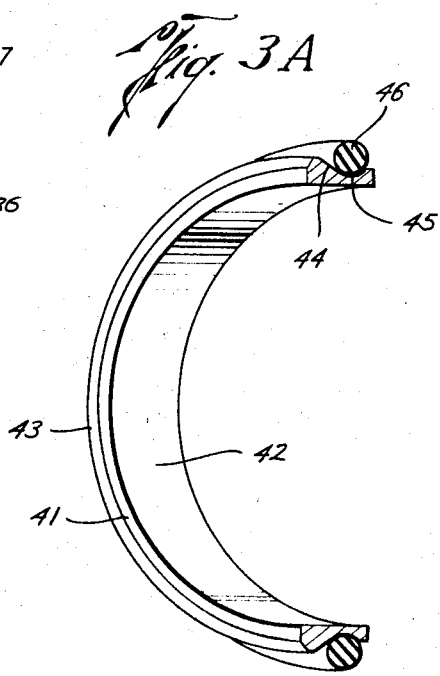

United States Patent Office 3,449,024
Patented June 10, 1969

3,449,024
SEAL ARRANGEMENT BETWEEN RELATIVELY
ROTATABLE MEMBERS
Carl L. Lichte, Dallas, Tex., assignor to Dresser Industries,
Inc., Dallas, Tex., a corporation of Delaware
Continuation of application Ser. No. 437,990, Mar. 8,
1965. This application Nov. 6, 1967, Ser. No. 681,037
Int. Cl. F16c 19/00, 29/00, 33/72
U.S. Cl. 308—8.2                                    8 Claims

ABSTRACT OF THE DISCLOSURE

The disclosure involves a bearing shaft having one integral part extending through a rolling annular cutter and supported by parts engaging its projecting ends. The maximum possible part of the length of the cutter is taken up by radial and thrust bearings rotatably supporting the cutter on the shaft to hermetically seal the bearing space by seals each having a rigid ring yieldably carried by and sealed to the shaft or cutter and resiliently urged axially into sealing engagement with an axially facing integral shoulder on the other. Both rings are axially movable in the same direction into place in the cutter and in the opposite direction into place on the shaft.

---

This application is a continuation of Ser. No. 437,990 filed Mar. 8, 1965, now abandoned.

This invention relates to a seal arrangement between relatively rotatable members and has particular reference to such a seal arrangement for use between parts adapted to operate in a highly abrasive surrounding medium for the purpose of protecting a high capacity heavy duty bearing between said parts where the bearing in use is frequently operated under near-maximum bearing capacity loads, if not in excess thereof. An example of such service is that involved in sealing between the rotating cutters and their supporting shafts in a rolling cutter earth boring drill so as to confine the lubricant to the bearings for such cutters and exclude the abrasive surrounding medium in which such a drill operates and keep such abrasive out of the bearing.

One of the prime requirements of a seal for thus sealing the bearings of earth boring drill cutters is that the seals occupy the minimum of space both radially and in an axial direction so as to avoid the reduction in thickness of the shell forming the cutter as well as the reduction in diameter of the shaft and hence the weakening of either of these elements in order to accommodate the seal; and also to avoid the necessity for shortening the axial extent of the bearing and thus reducing the usually marginal bearing capacity in order to accommodate the seal.

Therefore it is one of the objects of this invention to provide an effective seal between a relatively rotatable shaft and annulus which will have the minimum space requirements between such members both in a radial direction and in an axial direction.

Another object of this invention is to provide such seals which will make assembly of such relatively rotatable parts and their bearings with the seals much easier than with seals for similar purposes heretofore.

Another object of this invention is to provide such seals which will be less expensive than seals for similar purposes heretofore known and yet be highly effective as seals.

Another object of this invention is to provide such seals which will require a minimum number of separable parts.

Another object of this invention is to provide such seals in which parts of special materials and requiring highly specialized preparation are reduced to a minimum.

Another object is to provide a seal in which such parts of special materials and requiring highly specialized treatment in preparation for use may be reduced to a minimum both as to number and as to size without danger of failure involved in similar parts in usually employed seals for similar purposes.

Other objects and advantages of this invention will become apparent from the following description taken in connection with the accompanying drawings wherein is set forth by way of illustration and example one embodiment of this invention.

In the drawings:

FIG. 3 is an enlarged fragmentary view of that portion of FIG. 1 appearing within the broken circle 3 thereof.

FIG. 2A is a view in perspective with approximately one-half broken away and shown in cross section illustrating the hard metal seal ring and resilient torus or O-ring providing a part of the seal illustrated in enlarged cross section in FIG. 2.

FIG. 3A is a view similar to FIG. 2A but illustrating the corresponding parts of the seal illustrated in enlarged cross section in FIG. 3.

Figure 1:
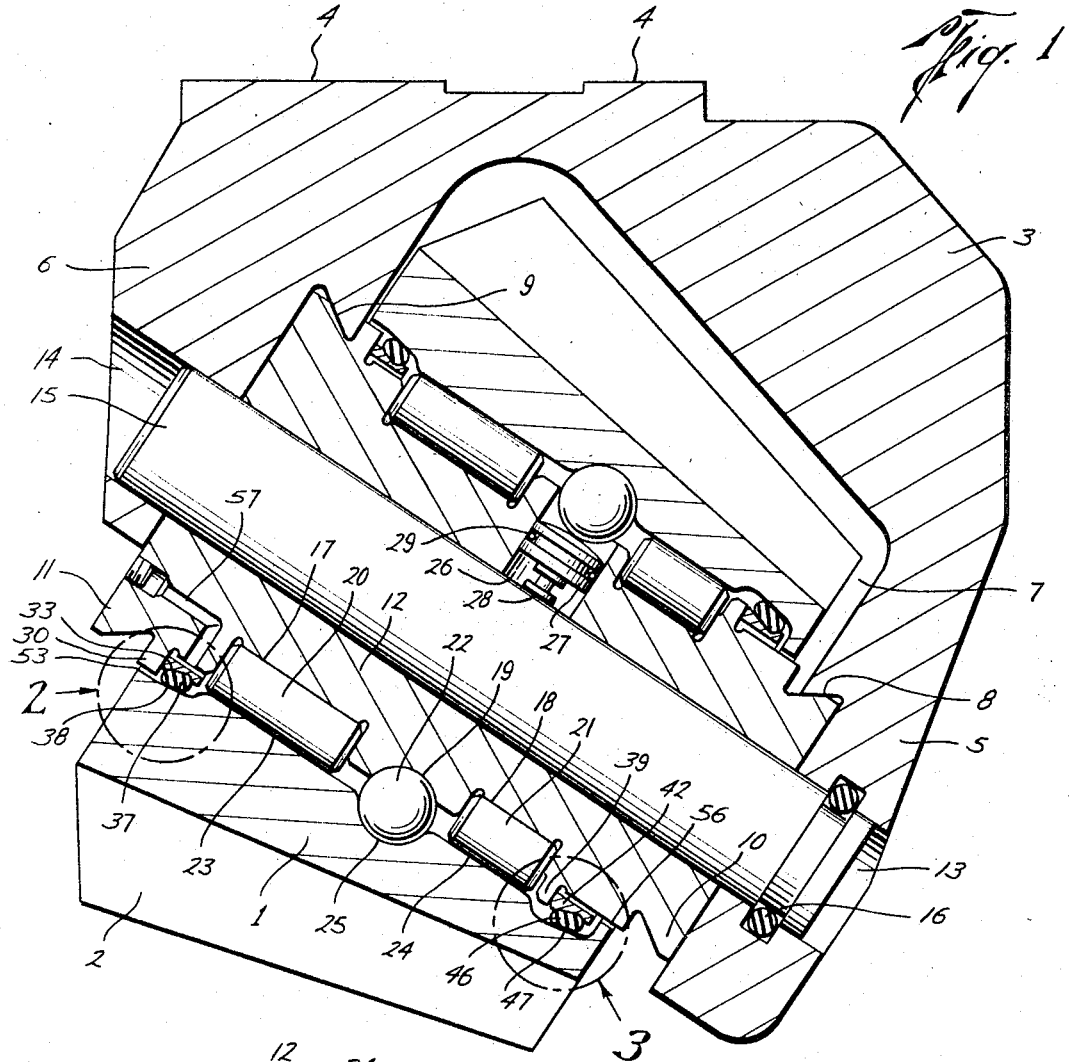
FIG. 1 is a longitudinal cross section through a rolling cutter for an earth boring drill bit together with its associated supporting bearing shaft and yoke, illustrating seals constructed in accordance with this invention employed in the opposite ends of such cutter.

Referring more in detail to the drawings, the rolling cutter 1 illustrated in FIG. 1 is of substantially conventional construction except in its specific arrangement to receive the seals of this invention, and is normally provided with cutter teeth 2 on its outer surface, which cutter teeth however may take any one of numerous well known forms depending upon the type of formation it is designed to operate in. The mounting for this cutter is illustrated as comprising a yoke or bracket 3 having precision formed bosses with surfaces 4 adapted to be received on and secured to a drill head body. The bracket 3 illustrated is one adapted to be employed with an assembly providing a large hole drill of a character intended for drilling holes of three to fifteen feet or more in diameter, and the cutter itself would in such instance be of the order of eight to ten inches long and eight to twelve inches in diameter.

The bracket 3 is in the form of a yoke having downwardly extending legs 5 and 6 providing a space 7 between them to receive the cutter, and having dovetail grooves on their inner surfaces extending upwardly from their lower ends as shown at 8 and 9 to receive tenon-like bosses 10 and 11 on opposite ends of the bearing shell 12 which provides the actual bearing surface for the bearings supporting the cutter 1 as well as for receiving the seals of this invention.

The legs 5 and 6 are provided with aligned holes 13 and 14 receiving opposite ends of the pin 15 which extends through and retains the shell 12. The shaft or shell 12 is held against rotation relative to the bracket 3 by suitable means such as the interengaging dovetail grooves and tenons which are eccentric relative to the hole in the shell which retains the pin 15.

The pin 15 may be retained in place in the openings 13 and 14 by any suitable means such as a circular key 16 of the character formed by an ordinary nail or similar shaft driven in through a tangential opening into the matching circumferential grooves in the shaft and interior of the hole 13 through the leg 5.

By the means just described, it will be appreciated that the bearing shell 12 which, for purposes of this invention, will be referred to as a shaft, serves as one of two relatively rotatable members and carries the bearings which support the other member 1 in the form of an annulus. It will be understood, however, that in the langauge of this application the terms "shaft" and "annulus" are not to be construed as limited to the specific form of either shaft or annulus illustrated, but merely as having reference to two members, one of which surrounds a portion of the other and one of which is rotatable relative to the other with a seal or seals constructed in accordance with this invention employed therebetween so as to prevent leakage in an axial direction between such members either while they are rotating relative to one another or while they are static relative to one another.

As heretofore noted, one of the very critical problems encountered in the construction of earth boring drill bits is that of providing sufficient bearing capacity for supporting the tremendous loads imposed on such bits during drilling operations. For this reason, it is highly essential that the axial extent of the exterior of the shaft such as 12 and the interior of the cutter such as 1 which is available for use to provide relative bearing between these two parts be the greatest possible. Further, it is important that the diameter of the shaft within such bearings be at all points as great as possible in order to provide adequate support for the bearings and prevent shaft failure under stress, and that the thickness of the cutter wall between the bearings and the bases of the teeth 2 be at all points as great as possible. Even in the design of these parts to provide room for the bearings only it will be seen that compromises must be employed in order to achieve optimum results. It will further be seen that only the barest minimum of either radial or axial space can be allotted for seals without prohibitive impairment of the strength required in the parts just described and it is for this reason that in the past the provision of efficient seals has in most instances given way to less efficient sealing to minimize space requirements of the seals in designing earth boring drill bits.

The shaft 12 is shown as being provided with two axially spaced roller bearing races 17 and 18 and a ball bearing race 19 between them on the exterior surface of the shaft. These races receive respectively bearing rollers 20 and 21 and balls 22. Likewise, on the interior of the cutter or shell 1 there are provided two longitudinally spaced roller bearing races 23 and 24 and a ball bearing race 25 between them, the races 23, 24 and 25 being so positioned that when the cutter is in appropriate position on the shaft 12 these races will register respectively with the races 17, 18 and 19 on the shaft.

In the bearing arrangement illustrated, the primary radial load is taken through the roller bearings 20 and 21 and the races 23 and 24 within the cutter shell 1 are made without flanges at their ends so that the rollers 20 and 21 may first be put in place on the shaft 12 and then the cutter shell 1 slipped in place from the right-hand end of the shaft 12 as the parts appear in FIG. 1.

In order to lock the cutter shell 1 in place on the shaft 12 against endwise movement thereon and take thrust loads between these parts, the shaft 12 is provided with a radial bore 26 of a diameter to provide passage for the balls 22 and extending radially from the hollow interior of the shaft 12 outwardly to intersect the race 19. It is apparent that before the pin 15 is put in place in the shaft 12 but after the roller bearings 20 and 21 and the shell 1 have been put in place on the shaft 12, the balls 22 may be inserted through the hollow shaft 12 and in through the radial passageway 26 into the mating ball races 19 and 25, and that when the said races are substantially filled with balls 22, said balls will serve to lock the cutter shell 1 in place on the shaft 12 against endwise movement with respect thereto, and to take thrust loads from the shell 1 and transmit them to the shaft 12. The passageway 26, which is preferably disposed in an upward direction with respect to the position of the cutter support parts in use, is plugged after the insertion of the balls 22 by means of a plug 27 fitting snugly within the passageway 26 and having a groove thereabout to receive an O-ring type of seal 29. Preferably the outermost surface of this plug is provided with a curvature as illustrated which is of the same radius as the distance from the axis of the shaft 12 to the nearest point of the ball race 19, so that the balls 22 will roll smoothly across it in actual use. In order to provide for ready removal of the plug 27, it is provided with a head 28 which is of such a dimension that it bears against the pin 15 when the same is in place and is thereby held in proper position in the bore 26, but when the pin 15 is removed, the head 28 will be accessible to a suitable tool for extracting the plug 27 toward the hollow interior of the shaft 12.

The form of seal arrangement embodying the present invention will now be described.

The portion of this seal which is carried on the shaft 12 and non-rotatable with respect to the shaft 12 is on radially extending flanges integral with the shaft 12. This portion of the seal at the upper left-hand section of FIG. 1 is provided by the flange 30 which is integral with the shaft 12 and which has a plane radial face 31 facing toward the bearings with a part smoothly machined to receive the finely ground surface 32 on the seal ring 33. In addition to the sealing surface 32 which bears against the opposed sealing surface integral with the flange 30 on the shaft, the ring 33 has a part of its end surface adjacent the sealing surface 32 beveled as shown at 34. Facing the opposite direction from the direction of the bevel 34 is a tapering surface 35 on the ring 33, the deepest part of this taper at 36 forming the thinnest radial dimension of the ring 33. This taper 35 on the ring 33 is adapted to receive a resilient cushioning ring 37 which is of elastomer and is preferably in the form of a torus or toroid, and the taper 35 is opposed in use to a taper in the same direction at 38 within the cutter annulus 1. The ring 37 is made of an undistorted radial dimension such that when placed around the exterior of the ring 33 within the taper 35 thereon, it will be under circumferential tension, and is of a cross section such that when placed between the two tapered annular surfaces 35 and 38 it will be compressed and distorted to a shape somewhat approximating that illustrated in FIG. 1 and FIG. 2. The taper 38 within the annulus 1 is in a direction to face toward the sealing surface on the flange 30 so that when the ring 37 is placed between the two tapers, the compression within this cross section and its circumferential tension will tend to make it roll between the two tapers in a direction to urge the ring 33 toward the flange 30. At the same time it will provide a cushioned mounting for the ring 33 within the annulus 1 permitting the ring a sort of floating motion within the annulus 1 and yet causing it to rotate with the annulus while the floating motion permits the seating surface 32 to seat at all time firmly and fully against the facing seating surface on the flange 30 regardless of whether the annulus 1 is properly aligned with respect to the shaft 12 or not.

At the opposite end of the annulus 1 a second and similar seal is provided by means of the flange 39 extending radially outwardly from the shaft 12 and the parts associated therewith. It should be noted that the sealing surface 40 on this flange 39 faces in the same axial direction as the sealing surface 31 on the flange 30, but that the flange 39 is sufficiently smaller than the flange 30 so that the ring 33 may have an internal diameter greater than the external diameter of the flange 39, making it possible to slip the ring 33 into place from that end of the shaft carrying the flange 39 and still have its end surface mate with the plane sealing surface 31 on the flange 30.

Mating with the sealing surface 40 on the flange 39 is an endwise highly polished sealing surface 41 on the seal ring 42. The end of this seal ring which faces the flange 39 has a portion beveled as at 43, the bevel in this instance being on the radially outmost portion of the end surface of the seal ring 42 as compared with the bevel 34 on the ring 33 which is on the radially innermost portion of the end surface thereof.

Like the ring 33, the ring 42 has a tapered surface 44 on its exterior tapering in a direction so that it faces away from the end carrying the sealing surface 41, and terminating at its deepest part 45 so as to provide the radially thinnest portion of the ring 42. Lying against this tapered surface 44 is a resilient mounting ring 46 which, like the ring 37, is formed of an elastomer and is preferably in the form of a torus or toroid. This ring is of such a dimension that when placed around the tapered surface 44 of the ring 42 it will be under tension circumferentially. The taper 44 is in use opposed by an interior tapered surface 47 within the annulus 1, which tapers generally in the same direction as the tapered surface 44, and the toroid or resilient ring 46 is of such cross sectional dimension that when placed between these two tapered surfaces it will be placed under radial compression therebetween. As in the case of the ring 37, both the circumferential tension and the radial compression will tend to urge the ring 42 axially toward the surface 40 of the flange 39, and the resilent mounting provided by the ring 46 will cause this ring to rotate always with the annulus 1 but permit it to move relative to the annulus so that at all times it will seat firmly against the surface 40 on the flange 39 even though the annulus 1 be substantially misaligned with respect to the shaft 12.

Although the rings 37 and 46 are each preferably in the form of a torus or toroid, other cross section shapes may be employed, which will not roll or will not readily roll, in which case the compression of the elastomer between the tapered surfaces will produce a force tending to separate such surfaces, the axial component of which will yieldably and resiliently hold the sealing surfaces together.

It will be understood that while it is preferred that the flanges 39 be integral with the shaft 12, a reversal of this arrangement could be employed.

It will be further understood that while it is desirable and highly advantageous that the sealing surface on the parts carried on the shaft both face in the same direction, thereby making possible the mounting of the cutter or annulus by slipping it over one end of the shaft and toward the other end, it is conceivable that in some arrangements a different disposition might be employed.

In the arrangement illustrated it will be seen that the bevels 34 and 43 on the rings 33 and 42, respectively, are disposed in radially different directions from the sealing end surfaces 32 and 41 respectively. The reason for this is that these bevels are for the purpose of permitting the entry of lubricant into the spaces between the ends of the rings and the surfaces of the adjacent flanges, thereby providing for lubrication between the rings and flanges which rotate relative to one another. In each case the bevel is toward that part of the assembly in which the bearings are contained and in which lubricant is carried in use of the assembly.

Inasmuch as it is to be somewhat expected that the bearings in usage such as that of an earth boring drill bit, being loaded to the maximum, will become worn considerably in usage so as to allow substantial misalignment of the annulus 1 with respect to its shaft before the period of usage is over, the provision for such misalignment without interfering with the effectiveness of the seals is highly important and this is provided by the resilient mounting of the rings 33 and 42 on the resilient rings 37 and 46, respectively. In order that radial and similar movement other than a strictly circular movement which might take place in use of the device be automatically compensated for, it is advantageous that the sealing surfaces on the flange 30 and the end of the seal ring 33 as well as on the flange 39 and the end of the seal ring 42 be of different hardness and not both made very hard as has been customary with somewhat similar seals in the past. Because of this relationship of hardness, the sealing surface on the seal rings will be unlikely to be worn out of shape by the relatively soft flanges integral with the shaft 12. The seal rings 33 and 42 are preferably made of extremely hard wear metal of which numerous satisfactory examples are available on the market, one such composition being tungsten carbide. Such hard metal rings, once provided with a highly ground and polished sealing surface on its end, and opposed to a relatively soft surface on flanges on the shaft as shown, will wear the flanges on the shaft relatively rapidly so as to provide accurately mating surfaces thereon at all times, while remaining substantially unworn themselves.

However, such extremely hard wear materials are characteristically easily broken by impact and it has been thought necessary in using such materials in seal rings and the like in the past to make them of fairly heavy cross section in order to avoid fractures due to impacts and the like in use. Such danger would be especially apparent in the extremely heavy duty use in connection with drill bit cutter mountings as described.

In order to overcome this difficulty in the past, it has been the custom to provide seal rings of generally similar purpose with radially extending flanges on those ends carrying the sealing surface and to form the sealing surface on the radially outermost extremities of such flanges, making the sealing surfaces relatively small in area as compared with the entire end surface area of the ring.

Figure 2:
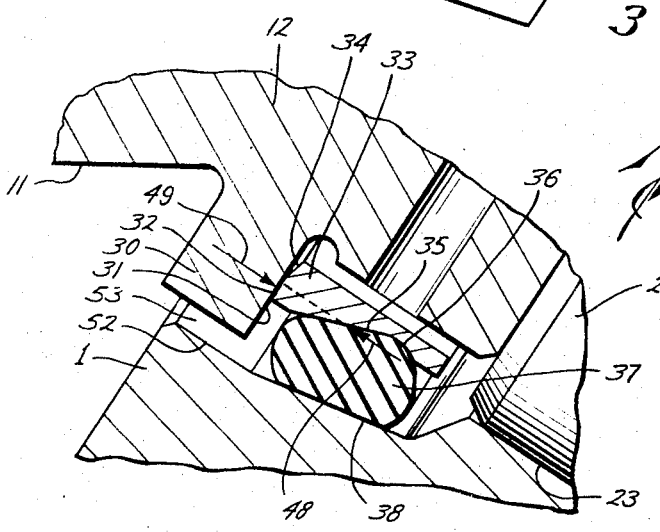
FIG. 2 is a fragmentary enlarged view of that portion of FIG 1 appearing within the broken circle 2 thereof.

In usage such as that for mounting bit cutters, the radial space available for seals being at such a high premium as hereinbefore described, the rings employed in this invention have eliminated such radially outwardly extending flanges thereby made possible rings of much smaller cross section. It has been found that this was possible by the expedient of making the tapered surfaces on the rings substantially in axial alignment with the endwise directed sealing surfaces on the same rings so that the effective center of pressure in any axial plane of the axial components of the forces by which the resilient rings urge the seal rings toward their seats will if projected axially pass through or very close to the bearings of these seats upon the rings and avoid any tendency toward twisting the rings. By thus avoiding the twisting tendencies on the rings it was found that the making of the rings of smaller cross section area will be permissible without fracture of the rings resulting from impacts. Referring to FIG. 2, it will be seen that the effective resultant of the axial components in the plane of the drawing of the force exerted by the resilient mounting ring 37 on the seal ring 33 in a direction to cause it to seal is substantially along the arrow 48, while the resultant of the reaction to this force is substantially along the arrow 49, each of these arrows being placed substantially midway between the extremities of the surfaces to which such forces are applied. It will further be seen that these arrows are very nearly in alignment with one another with little or no moment arm between them so that the application of these forces to the ring 33 will result in substantially no twisting tendency or stress on the ring.

Similarly, the effective resultant of the axial components, in the plane of the drawing, of the force applied by the resilient ring 46 to the seal ring 42 is substantially along the arrow 50 in FIG. 3, whereas the resultant of the reaction to this force is substantially along the arrow 51. While these are not exactly in alignment, there is a portion of the surface to which the force from the mounting ring 46 is applied to the ring 42 which is in axial alignment with a portion of the surface through which the reaction to this force is transmitted from the ring 42 to the flange 39. These two surfaces are nearly in alignment with one another and parts of them are in actual alignment with one another so that again the possible twisting tendencies on the ring 42 are avoided.

It has been found that by these arrangements not only could the radially extending flanges heretofore employed on such rings be eliminated, but that the rings could be shortened so as to further greatly reduce the cross sectional areas thereof and reduce the axial dimension required for the seals as well as the radial dimension required for same. It may be noted that the elimination of the radially extending flange on the rings also makes possible the use of resilient mounting rings of smaller cross section than would be necessary with seal rings having such radially extending flanges thereon.

Referring again to FIG. 2, it will be seen that there is clearance between the annulus 1 and the flange 30 provided by the spacing between the interior 52 of the annulus where it surrounds the flange 30, being great enough to provide the clearance 53. It is necessary that this clearance be fairly substantial in order to avoid possible mechanical interference upon wear of the bearings for the annulus, and through such clearance it is apparent that the mud or dust or other highly abrasive substance being drilled through can have ready access to the engagement between the end of the ring 33 and the face 31 of the flange 30. However, at this point these surfaces will be seen to be in tight engagement with one another so as to exclude abrasive particles from entering between these two elements.

At the opposite end of the shaft 12, the shaft is provided with an exterior surface 54 spaced endwise of the seal in the opposite direction from the bearing, and opposed to this surface 54 is an inwardly extending flange 55 on the annulus so as to provide a clearance 56 therebetween. Through this clearance access of abrasive material from the surroundings of the structure will have access to the interior of the ring 42 and the adjacent surface 40 of the flange 39. However, due to the fact that the bevel 43 in this instance is on the radially outermost part of the end surface of the ring 42, the end surface of the ring 42 and the adjacent surface of the flange 39 will be in tight engagement at the point where abrasive particles may have access thereto and thereby serve to exclude such abrasive particles.

Any suitable means may be employed for injecting lubricant into the space between the seals at the opposite ends of the bearing and surrounding the bearings. One such means involves the injection of such lubricant through a suitable fitting mounted in the passageway 26 prior to the mounting therein of the plug 27. Lubricant thereby injected may pass into all parts of the spaces between and surrounding the bearings and the spaces between the two seals, and air previously occupying this space may be vented during such injection procedure through a suitable vent opening 57 which may then be plugged.

From the foregoing it will be seen that this invention is one well adapted to attain all of the ends and objects hereinabove set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. In combination with a relatively rotatable annulus and shaft with the annulus surrounding the shaft, and a bearing between the shaft and annulus intermediate the ends of both shaft and annulus, said shaft and annulus adapted for operation in a highly abrasive surrounding medium under near-maximum bearing capacity loads, a seal between said shaft and annulus outwardly of each of the opposite ends of said bearing to confine lubricant between said shaft and annulus within said bearing and exclude abrasive surrounding medium from said bearing, each seal comprising a part having a plane radially extending sealing surface integrally carried on one of said shaft and annulus and a part having an annular surface integrally carried on the other said shaft and annulus tapering in a direction to face toward said sealing surface, said surfaces which are on said shaft both facing in one axial direction and those on said annulus in the other, a seal ring of hard material more wear-resistant than said sealing surface having a surface radially opposed to and spaced from and tapering in the same direction as said first-mentioned tapering surface and spaced radially therefrom and having a plane radially extending surface sealingly engaging said first-mentioned sealing surface, and a resilient ring of elastomer between said tapering surfaces of an undistorted cross-section greater than the space between said tapering surfaces and of an undistorted inner diameter less than the diameter of the inner of said tapering surfaces at its smaller end.

2. A combination as set forth in claim 1 in which said first-mentioned sealing surfaces are on the shaft, and the seal ring which is opposed to the first-mentioned sealing surface which faces towards the bearing has its internal diameter greater than the outer diameter of the part having the other radially extending sealing surface.

3. A combination as set forth in claim 1 in which the seal ring which is opposed to the first-mentioned sealing surface which faces towards the bearing has part of its end surface beveled toward that radial direction opposite the one in which its taper faces and the other of said rings has part of its end surface beveled toward the same radial direction in which its taper faces.

4. The combination as set forth in claim 1 in which at least one of the said seal rings have their radial extremity at the termination of the taper in the radial direction in which the taper thereon faces, and in which the sealing surface portion of the end face of each ring is in substantial axial alignment with the tapered surface thereon.

5. A cutter assembly for a rotary drill bit comprising:
a shaft arranged to be mounted on the bit;
an annulus encircling said shaft, said annulus having first and second ends;
bearing means journalling said annulus on said shaft and located between said ends;
a first radial flange integral with said shaft and located near the first end of said annulus;
a second radial flange integral with said annulus and located near the second end of said annulus, said flange being on opposite sides of said bearing means;
a first annular seal forming a seal between said shaft and annulus and located between said first radial flange and said bearing means; and,
a second annular seal forming a seal between said shaft and annulus and located between said second radial flange and said bearing means.

6. The cutter assembly of claim 5 wherein said shaft has a third radial flange formed integrally thereon projecting toward said annulus and located between said second seal and said bearing means.

7. The cutter assembly of claim 6 wherein said first annular seal has an inner diameter greater than the outer diameter of said third radial flange, whereby said first annular seal can be slipped thereover.

8. A cutter assembly for a rotary drill bit comprising:
a shaft arranged to be mounted on the bit;
an annulus encircling said shaft, said annulus having first and second ends;
bearing means journalling said annulus on said shaft and located between said ends;
a first radial flange integral with said shaft and located near the first end of said annulus;
a second radial flange integral with said annulus and located near the second end of said annulus,
a first annular seal forming a seal between said shaft and annulus located between said first radial flange and said bearing means;

a second annular seal forming a seal between said shaft and annulus located between said second radial flange and said bearing means;

a third radial flange formed integrally on said shaft projecting toward said annulus and located between said second seal and said bearing means;

said first annular seal having an inner diameter greater than the outer diameter of said third radial flange, whereby said first annular seal can be slipped thereover;

said first flange having a surface thereon facing said first annular seal and in sealing engagement therewith; and, said third annular flange having a surface thereon facing said second annular seal and in sealing engagement therewith.

References Cited

UNITED STATES PATENTS

| | | | |
|---|---|---|---|
| 3,086,782 | 4/1963 | Peilkii | 277—96 |
| 3,332,505 | 7/1967 | Schumacher | 175—372 |

MARTIN P. SCHWADRON, *Primary Examiner.*

LUCIOUS L. JOHNSON, *Assistant Examiner.*

U.S. Cl. X.R.

175—371; 277—92; 308—36.2, 187.1